June 20, 1933. J. MERCIER 1,914,814
ANTIROLLING PNEUMATIC SUSPENSION DEVICE
Filed Dec. 11, 1930
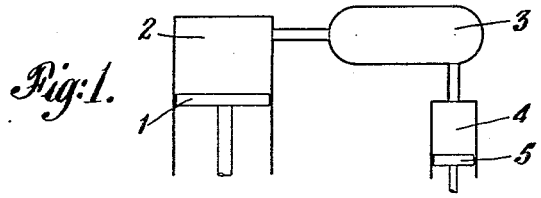
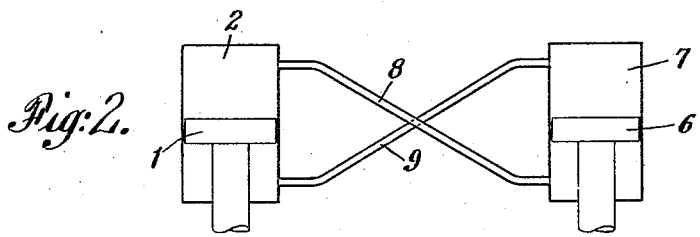
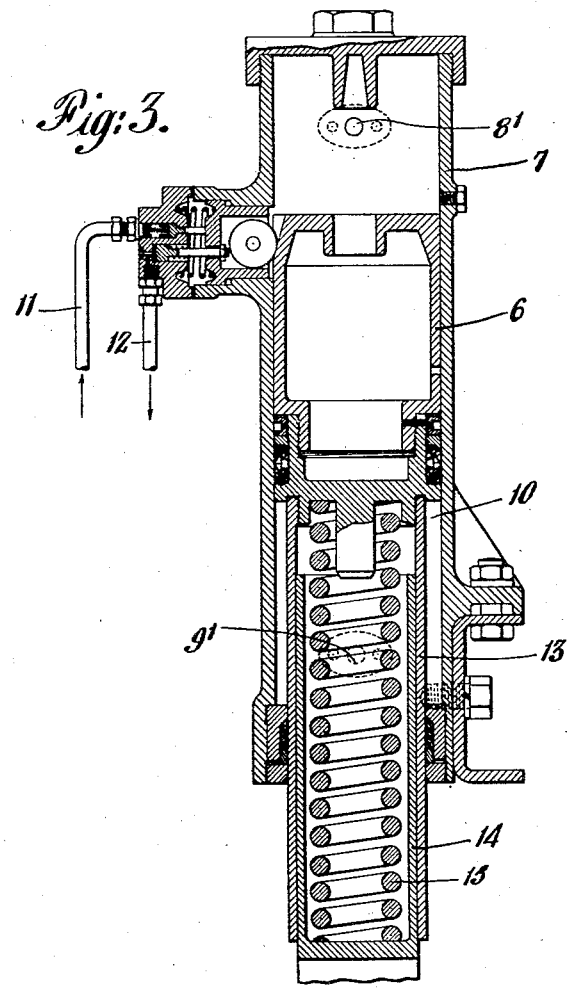
INVENTOR
JEAN MERCIER
BY
ATTORNEY Patented June 20, 1933

1,914,814

UNITED STATES PATENT OFFICE

JEAN MERCIER, OF PARIS, FRANCE

ANTIROLLING PNEUMATIC SUSPENSION DEVICE

Application filed December 11, 1930, Serial No. 501,520, and in France January 13, 1925.

My invention relates to shock absorbing devices and more particularly to a pneumatic anti-rolling device for use upon road vehicles and the like.

It is an object of my invention to provide means for increasing the flexibility of the pneumatic suspension device when wheels at opposite sides of the vehicle move toward or away from the vehicle at the same time, or when the axle moves vertically and parallel to its original position, and to decrease the flexibility or increase the resistance of the shock absorbing device when only one wheel moves toward or from the vehicle, or when the axle oscillates angularly about its middle portion.

It is also an object of the invention to provide a shock absorbing device of the type described which will operate quickly and smoothly to dampen any rolling action due to uneven shocks upon the wheels of a vehicle.

In describing the invention, reference will be made to its use in conjunction with a vehicle having an axle which may move toward and away from the vehicle as a unit, which motion I shall call rectilinear motion, and which may oscillate angularly with respect to the vehicle, which motion I shall call angular oscillations. It is not, however, intended to confine the use of the invention to a vehicle supported in this manner, since it may also be used with vehicles in which each wheel is supported separately and without having axles connecting them.

I obtain my improved result by adding to a pneumatic shock absorbing device a chamber having a variable volume, so arranged that the volume of the said chamber will increase or diminish in order to increase or diminish the flexibility of the suspension device according to whether the axle is given a rectilinear movement or an angular oscillation about its centre.

In describing the invention, reference will be made to the drawing in which Figures 1 and 2 are diagrammatic views illustrating the principle of the invention. Figure 3 is a constructional form of the differential piston shown in Figure 2, said piston being shown in section.

In Figure 1 the pneumatic suspension device is represented by the piston 1 which is actuated by the movement of one of the vehicle wheels relative to the vehicle frame, and by a cylinder 2 which is secured to the vehicle frame. The cylinder 2 is connected by a tube to the reservoir 3 which, in turn, is connected by a tube to the cylinder 4 which confines a variable volume of air, depending upon the position of the piston 5. The piston 5 is actuated so as to move in a direction opposite to that of the piston 1 when the vehicle axle is given a rectilinear motion and so as to move in the same direction as piston 1 when the axle is given an angular oscillation. The piston 5 may be actuated, for example, in proportion to the displacement of the wheel which is on the same axle as the wheel which actuates the piston 1.

From the above description it is apparent that when the wheels of a vehicle strike a bump or depression which causes the axle to be given a rectilinear motion, the pistons 1 and 5 will move in opposite directions so as to decrease the compression which would ordinarily result in a cylinder of a shock absorbing device without an added chamber such as described. Thus, with such a motion of the axle the flexibility of the shock absorbing device would be increased. When, on the other hand, the wheels of the vehicle strike bumps or depressions in such a manner that the axle would be given an angular oscillation, the pistons 1 and 5 will move in the same direction so as to increase the compression within the cylinder 2. With such a motion of the axle the flexibility of the shock absorbing device will be decreased and the rolling action will be dampened.

In Figure 2 I have illustrated a particularly advantageous arrangement of my invention, wherein a piston 6, like piston 1, is actuated by the movement of the wheel on the opposite side of the vehicle from that actuating the piston 1. The piston 6 operates within a cylinder 7, like cylinder 2, which is fixed to the vehicle frame upon the opposite side of the vehicle from the cylinder 2. The double acting pistons 1 and 6 fit tightly within the closed cylinders 2 and 7, respectively, so that the air confined within the cylinders on opposite sides of the piston will be compressed and rarefied upon movement of the pistons within the cylinders. The upper portion of the cylinder 2 is connected to the lower portion of the cylinder 7 by a nonexpansible tube 8 of small diameter, and the lower portion of the cylinder 2 is connected to the upper portion of the cylinder 7 by a similar tube 9. The piston stems which actuate the pistons 1 and 6 are of such size that the effective surface area of the upper surface of the piston is considerably greater than that of the lower surface.

The anti-rolling device illustrated in Figure 2 and described above operates as follows: Sufficient compressed air is forced into the cylinders 2 and 7 to carry a portion of the weight of the vehicle and to suspend the latter so that the pistons 1 and 6 are normally at about the middle of their respective cylinders. When the wheels of the vehicle strike a sharp rise or depression which tends to give the axle a rectilinear movement the pistons 1 and 6 will be moved in like directions with the result that the normal compression of air in the upper parts of each cylinder will not take place because of the increased capacity beneath the piston in the opposite cylinder, as a result of the movement of that piston. Since, however, the volume of the air space beneath each piston is considerably less than that of the space above the piston on the opposite side, there will be some retarding effect even with this type of motion.

When the wheels of the vehicle strike a sharp rise or depression which tends to give the axle an angular oscillation, the pistons 1 and 6 will be actuated in opposite directions in the cylinders 2 and 7. The opposite motions of the pistons will increase the compression upon the air confined beneath the downwardly moving piston and above the upwardly moving piston with the result that the rolling motion of the vehicle will be quickly but smoothly dampened. The smaller volume and effective surface beneath the piston, as compared to that above the piston, will accentuate the compression resulting from such opposite movement of the pistons. In practice these two effects will cooperate to afford a very easy operation of the suspension device and will quickly decrease the undesirable rolling of the vehicle.

A constructional form of the cylinder and piston illustrated in Figure 2 is shown solely by way of example in Figure 3. In this embodiment the piston 6 is shaped to give a tight sliding connection within the cylinder 7 which is fixed to the frame of the vehicle by suitable bolts. A suitable packing ring may be provided in the piston 6 to prevent passage of air between it and the walls of the cylinder. The piston 6 is actuated by the stem 13 telescopically enclosing the member 14, which is connected to the axle. The member 14 has its end hollowed out to receive the coil spring 15 which is positioned to cooperate with the compressed air to resiliently support the vehicle and to absorb a portion of the shocks transmitted from the wheel to the piston 6 through the telescopically positioned members 13 and 14. The sleeve 13 is preferably of such an outside diameter as to provide an annular chamber 10, having a volume per inch of length which is preferably less than half of that of the space above the piston and which presents an effective piston surface less than half of that of the upper surface of the piston. The space above the piston 6 is connected, through the port 8' and the tube 9, to a space corresponding to 10 beneath a similar piston 1 in a similar cylinder 2 upon the opposite side of the vehicle. The space 10 is likewise connected through the port 9' and the conduit 8 to a space above the piston 1 corresponding to that above the piston 6. The pipes 11 and 12 are provided to supply and exhaust, respectively, the compressed air used in the shock absorbing device.

This device operates as described above in connection with that shown in Figure 2. If desired, the capacities of the chambers above or below the piston may be varied by other suitable means, for instance, by a variation in the length of wall surface or by the introduction of an incompressible liquid. If the incompressible liquid is introduced into the spaces above or below the piston, the quantity should not be sufficient to cover the ports 8' or 9', since it is important, in obtaining a smooth shock absorbing action in a device of this type, that an air cushion be provided beneath the pistons as well as above them and also that the connecting tubes be filled with a gaseous fluid rather than with a more viscous fluid, such as oil, which would retard the coaction between the opposed cylinders.

It is quite apparent that in the devices described above, the rolling movement of the vehicle will be quickly dampened because of the cushioning action beneath the piston and because of the practically instantaneous cooperation between the cylinders on opposite sides, due to the use of a gaseous fluid beneath the pistons in the connecting tubes.

This application is a continuation of my application Serial No. 42,025, filed July 7, 1925.

The terms used in describing and claiming my invention have been used in their descriptive sense and not as words of limitation and it is intended to include within the scope of the appended claims all equivalents of the terms used.

What I claim is:

1. An anti-rolling and suspension device for a vehicle having a frame member and an axle member adapted to oscillate angularly and move laterally relative to said frame member, comprising a pair of closed cylinders supported by one of said members and a pair of pistons connected to the other of said members and adapted to fit tightly within said cylinders, the upper surface areas of said pistons being more than twice as great as their lower surface areas, a tube connecting the upper portion of each of said cylinders with the lower portion of the other cylinder, and a volume of compressed gaseous fluid confined beneath said pistons in their normal position.

2. An anti-rolling and suspension device for vehicles having a frame and wheels adapted to support the frame but capable of vertical movement relative thereto, comprising a pair of closed cylinders each having a piston positioned to be actuated within it by the vertical movement of one of the wheels relative to the frame, the upper surface areas of said pistons being more than twice as great as their lower surface areas, a tube connecting the upper portion of each of said cylinders, with the lower portion of the other of said cylinders, and a volume of compressed gaseous fluid confined beneath said pistons in their normal position.

3. An anti-rolling device for a vehicle having a frame and wheels adapted to support the frame but capable of movement relative thereto, comprising a pair of closed cylinders each having pistons positioned to be actuated within it by the vertical movement of one of the wheels relative to the frame, the surface area of the compression side of each of said pistons when the corresponding wheel moves upwardly being more than twice as great as the surface area of the other side of the piston, a tube connecting the portion of one of said cylinders beyond the piston surface therein of greater area with the portion of the other of said cylinders beyond the piston surface therein of smaller area, and a volume of compressed gaseous fluid confined beneath said pistons in their normal positions.

In testimony whereof, I have signed my name to this specification this 26 day of November, 1930.

JEAN MERCIER.